United States Patent [19]

Rudolph

[11] Patent Number: 4,812,376

[45] Date of Patent: Mar. 14, 1989

[54] ANODE COATING FOR LITHIUM CELL

[75] Inventor: Frank W. Rudolph, Depew, N.Y.

[73] Assignee: Wilson Greatbatch Ltd., Clarence, N.Y.

[21] Appl. No.: 108,453

[22] Filed: Oct. 15, 1987

[51] Int. Cl.⁴ .................. H01M 6/18; H01M 10/36
[52] U.S. Cl. .......................... 429/101; 429/213; 429/191; 29/623.5; 427/58
[58] Field of Search ............ 429/191, 192, 212, 213, 429/101, 196; 29/623.1, 623.5; 427/58, 384

[56] References Cited

U.S. PATENT DOCUMENTS

| | | | |
|---|---|---|---|
| 3,773,557 | 11/1973 | Mead | 429/192 |
| 3,957,533 | 5/1976 | Mead et al. | 136/83 R |
| 3,993,501 | 11/1976 | Kalnoki-Kis | 429/48 |
| 4,182,798 | 1/1980 | Skarstad | 429/213 |
| 4,210,708 | 7/1980 | Mead et al. | 429/181 |
| 4,296,185 | 10/1981 | Catanzarite | 429/48 |
| 4,359,818 | 11/1982 | Zayatz | 29/623.1 |
| 4,398,346 | 8/1983 | Underhill et al. | 29/623.5 |
| 4,598,283 | 10/1987 | Doddapaneni | 429/101 |
| 4,608,322 | 8/1986 | Howard et al. | 429/105 |
| 4,666,799 | 5/1987 | Runquist et al. | 429/101 |

Primary Examiner—Donald L. Walton
Attorney, Agent, or Firm—Christel, Bean & Linihan

[57] ABSTRACT

In an alkali metal/halogen or oxyhalide electrochemical cell wherein an alkali metal anode, preferably lithium, has a surface in operative contact with a halogen-containing or oxyhalide cathode/electrolyte including a solvent if necessary, a coating on the anode surface comprising a thin film or substrate material impregnated with organic material, for example organic electron donor material, or other suitable coating material. The substrate material is flexible, preferably a synthetic open mesh fabric material, and the film is prepared by contacting the substrate material with a solution of the organic material and solvent followed by drying. The resulting film is flexible and is applied to the operative surface of the anode thereby coating the same, preferably adhered to the surface by pressing. The flexible film can be applied equally well to anode surfaces which are either smooth and flat or irregular.

47 Claims, 5 Drawing Sheets

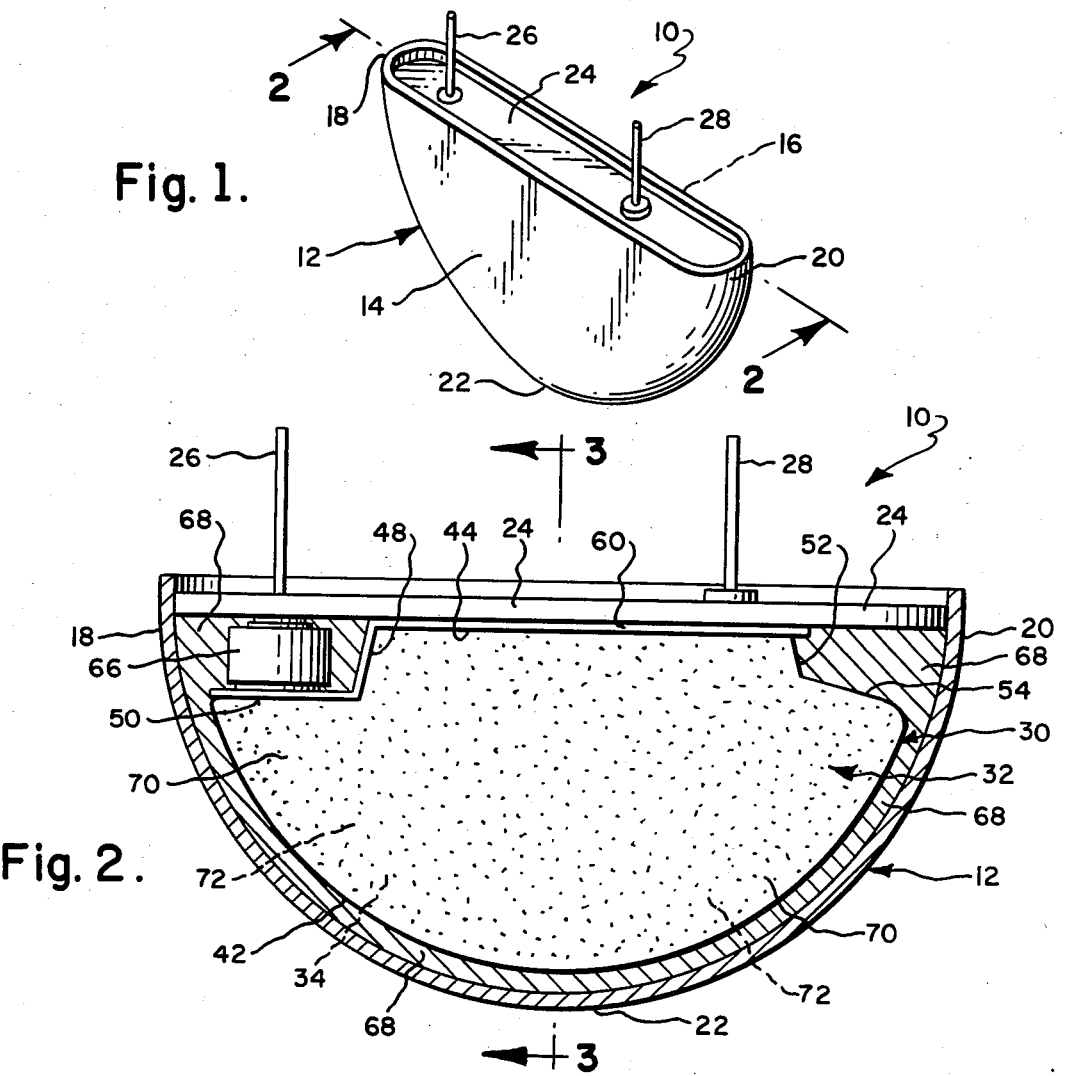
Fig. 1.
Fig. 2.
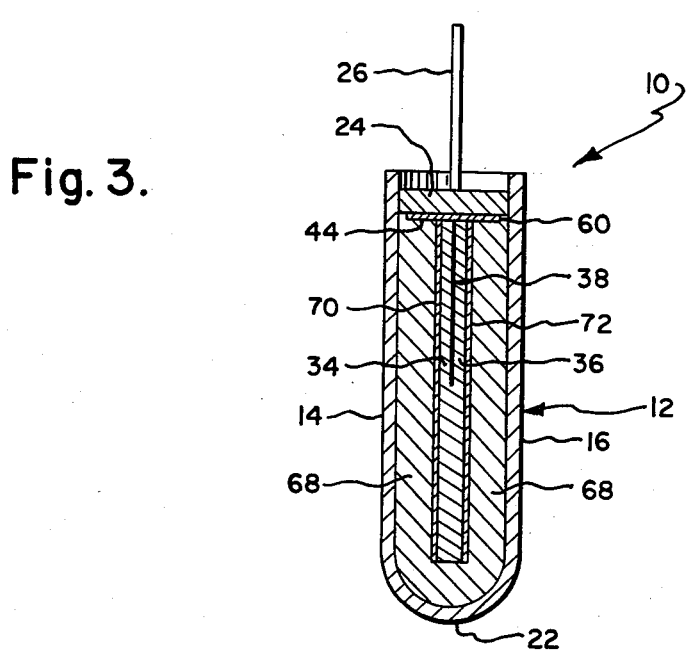
Fig. 3.

ANODE COATING FOR LITHIUM CELL

BACKGROUND OF THE INVENTION

This invention relates to the art of electrochemical cells, and more particularly to a new and improved anode coating for alkali metal-halogen cells.

The recent growth in small-sized electronic devices has required electrochemical cells having high energy density and current delivery capability. As a result of this need alkali metal halogen and alkali metal oxyhalide cells have been developed wherein the anode typically is lithium and the electrolyte is either solid or liquid. In the development of such cells it has been found advantageous to coat the operative anode surface with organic material. In the alkali metal/oxyhalide solid electrolyte cells the anode coating advantageously results in a greater utilization of the surface of the lithium anode by the cathode material of the cell and a reduction in cell impedance. In the liquid electrolyte cells the anode coating advantageously inhibits the formation of compounds on the anode surface which otherwise would cause passivation which gives rise to a voltage delay after storage at elevated temperatures.

One method of coating lithium anodes is applying a solution of the organic material in solvent to the anode surface by painting or brushing. Examples of this method are found in U.S. Pat. Nos. 3,957,533, 3,993,501, 4,296,185 and 4,608,322. This method obviously requires careful work by the applicator, is time consuming, requires exposure of the lithium anode during drying, and may require certain control procedures in handling the solvent. Another method is forming a sheet of the organic material such as by hot pressing and then applying the preformed sheet of the organic material to the anode surface, often in conjunction with an adhesive. Examples of this method are found in U.S. Pat. Nos. 4,182,798 and 4,398,346. This method requires use of a greater amount of the organic material since the sheet is entirely of such material, and the hot pressing procedure has energy requirements as well as handling requirements including selection of materials for the platens which will not adhere to the hot pressed organic material.

In coating lithium anodes with a pre-formed film, it has been determined desirable according to the present invention that the film have some flexibility. When the film is made from organic donor material using solvents alone, it is particularly difficult to retain flexibility of the film under dry room conditions. Also, flexibility becomes particularly important when the pre-formed film is to be applied to a lithium anode surface which is not flat but instead has surface formations, i.e. grooves, for the purpose of increasing the available anode surface for operative contact with the cathode material. Such an anode surface is illustrated, for example, in U.S. Pat. No. 4,201,708.

SUMMARY OF THE INVENTION

It is, therefore, a primary object of this invention to provide a new and improved anode coating for alkali metal/halogen or oxyhalide cells and method of making the same.

It is a further object of this invention to provide such an improved coating in the nature of a pre-formed film which is applied to the anode surface.

It is a more particular object of this invention to provide such a pre-formed film for anode coating which has some flexibility.

It is a further object of this invention to provide such a pre-formed film for anode coating which includes organic donor material and is flexible in nature.

It is a further object of this invention to provide such a pre-formed film for anode coating which is flexible in nature and adheres well to the surface of the metal anode.

It is a further object of this invention to provide such an anode coating and method which is convenient, effective and economical.

The present invention provides, in an alkali metal/halogen or oxyhalide electrochemical cell wherein an alkali metal anode, preferably lithium, has a surface in operative contact with a halogen-containing or oxyhalide cathode/electrolyte including a solvent if necessary, a coating on the anode surface comprising a thin film of substrate material impregnated with organic material, for example organic electron donor material, or other suitable coating material. The substrate material is flexible, preferably a synthetic open mesh fabric material, and the film is prepared by contacting the substrate material with a solution of the organic material and solvent followed by drying. The resulting film is flexible and is applied to the operative surface of the anode thereby coating the same, preferably adhered to the surface by pressing. The flexible film can be applied equally well to anode surfaces which are either smooth and flat or irregular.

BRIEF DESCRIPTION OF THE DRAWING FIGURES

FIG. 1 is a perspective view of an alkali metal/halogen cell having a coated anode according to the present invention;

FIG. 2 is an enlarged sectional view taken about on line 2—2 in FIG. 1;

FIG. 3 is a sectional view taken about on line 3—3 in FIG. 2;

DETAILED DESCRIPTION OF THE ILLUSTRATED EMBODIMENTS

Figure 4:
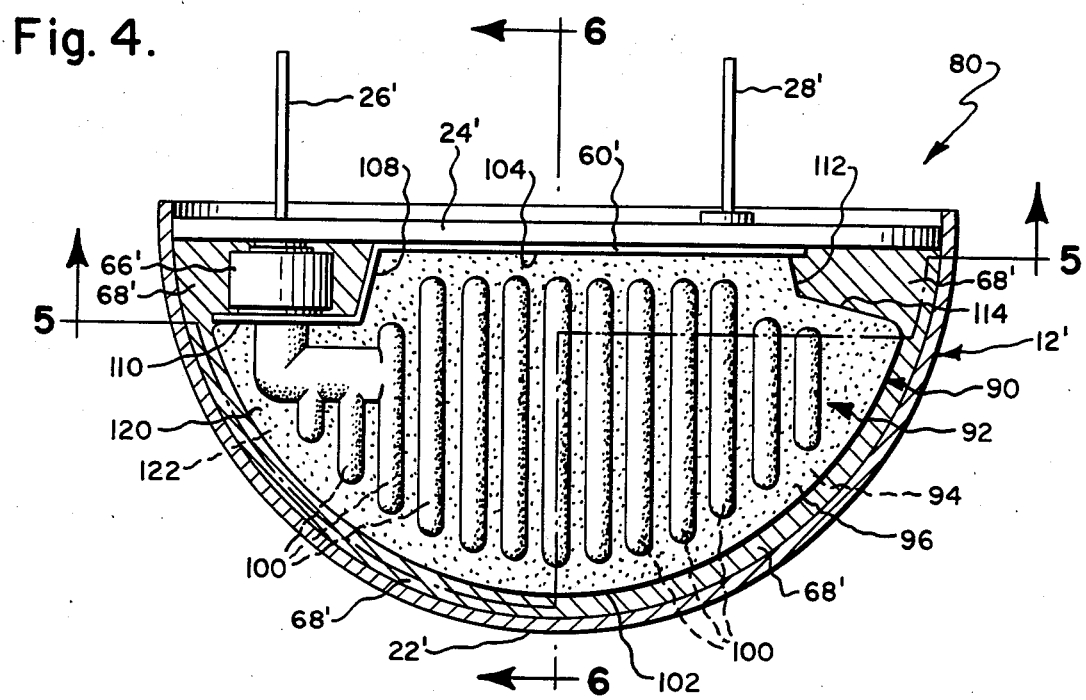
FIG. 4 is a sectional view similar to FIG. 2 of a cell according to another embodiment of the present invention.

Referring now to FIGS. 1-3, there is shown an alkali metal/halogen electrochemical cell 10 including a coated anode according to one embodiment of the present invention. The coated anode and other cell components are contained within a casing 12 of metal such as stainless steel including spaced apart side walls 14,16 joined by curved end walls 18,20 and a curved bottom wall 22. The open top of casing 12 is closed by a lid 24.

The coated anode of the present invention can be used with alkali metal/halogen or alkali metal/oxyhalide electrochemical cells of both solid and liquid electrolyte types. In the solid electrolyte type, for example a lithium-halogen cell, halogen-containing material such as a charge transfer complex of an organic donor component and halogen, is contained within casing 12 in an operative contact with the anode of the present invention and with the sides, bottom and end walls of the conductive metal casing 12 which serves as a cathode current collector. External cell connection is provided by terminal leads 26 and 28 which are operatively connected to the anode and cathode, respectively, of the cell in a manner which will be described. For a more detailed description of such a solid electrolyte cell, reference may be made to U.S. Pat. No. 4,401,736 issued Aug. 30, 1983 entitled Anode Assembly For Lithium Halogen Cell and assigned to the assignee of the present invention, the disclosure of which is hereby incorporated by reference. In the liquid electrolyte system, for example a lithium-oxyhalide cell, liquid electrolyte fills the casing interior and is in operative contact with the anode and with either the conductive casing serving as a cathode current collector or with a cathode element comprising a carbon body having a cathode current collector embedded therein with a lead extending therefrom to the terminal lead 28. A separator is employed between the anode and cathode. For a more detailed description of such a liquid electrolyte cell reference may be made to U.S. Pat. No. 4,246,327 issued Jan. 20, 1981 and entitled High Energy-Density Battery System, to U.S. Pat. No. 4,440,453 issued Aug. 23, 1983 and entitled Non-Aqueous Electrochemical Cell, and to U.S. Pat. No. 4,666,799 issued May 19, 1987 and entitled Current Collectors For Batteries Having Cathode-Electrolytes And Batteries Incorporating Same.

The electrochemical cell 10 includes an anode generally designated 30 according to the present invention and comprising an anode body 32 of alkali metal, preferably lithium. The body 32 can comprise a pair of lithium plates 34,36 pressed together and bonded against an anode current collector 38 which is a portion of the anode conductor means of the cell. Current collector 38 thus is sandwiched between plates 34,36 and can be of various forms such as a length of wire, a strand or ribbon, or a mesh or screen. Current collector 38 is of metal such as nickel or nickel alloy. Each of the plates 34,36 in the cell of FIGS. 2 and 3 has generally planar, flat oppositely directed generally parallel surfaces. The edge or periphery of each plate is shown in FIG. 2. In particular, each plate, for example plate 34 shown in FIG. 2, has a curved edge 42 extending along a major portion of the periphery or border and having a curvature conforming generally to the curvature of the casing bottom wall 22. A relatively straight edge portion 44 also is provided and meets curved edge 42 through step-like portions at each end thereof. In particular, the left hand end of edge 44 meets a relatively short inclined edge portion 48, which, in turn, meets another relatively short edge portion 50 leading to one end of the curved edge 42. Edge 50 is disposed generally parallel to edge 44 and is longer than edge 48. Similarly, the right hand end of edge 44 meets a relatively short inclined edge portion 52 which, in turn, meets another relatively short edge portion 54 leading to the other end of curved edge 42. Edge 54 is disposed at an acute angle to edge 44 and is longer than edge 52. Plate 36 is identical to plate 34 in size and peripheral outline the two plates being in registry or in alignment when pressed together.

A strip or band of electrical insulating material 60 is placed on and extends along edge 44 and the edge portions 48 and 50. Insulator 60 serves to insulate anode 30 from the metal lid 24 of casing 12 in a completed or assembled cell. Insulator 60 can be relatively thin and may have a width larger than the width of the anode as shown in FIG. 3. An anode lead (not shown) extends from the anode current collector 38 through an insulator and seal structure 66 and becomes the terminal lead 26 which extends through lid 24. For a more detailed description of an illustrative form of insulator and seal structure 66, reference may be made to the above-identified U.S. Pat. No. 4,401,736.

In accordance with the present invention the surface of anode 30 in operative contact with the halogen-containing cathode/electrolyte 68 is provided with a coating comprising a thin film of inert substrate material impregnated with organic electron donor or other suitable organic material. In the cell of the present invention, anode body 32 has two oppositely directed operative surfaces which are the exposed surfaces of plates 34,36, and these surfaces are provided with coatings 70 and 72, respectively, according to the present invention. Each coating, for example coating 70, comprises a thin film of substrate material preferably in the form of synthetic open mesh fabric material. The open mesh or open weave characteristic of the fabric material, i.e. allowing a significant flow of air therethrough, is important to insure that the substrate material does not act as a barrier to ion flow therethrough. By way of example, in an illustrative cell, the substrate can be of polyester open mesh fabric material. In particular, a preferred form of substrate material is #3251 Hollytex-Paper polyester. An alternative is a polyester-polyethylene combination commercially available from Filtration Unlimited Inc., Akron, N.Y. under the designation Reemay 2250 having 1000+cfm/fft$^2$ permeability in air. The thin film or substrate then is impregnated with organic electron donor material. In particular, the film or substrate is introduced such as by dipping into a solution of organic donor component material and solvent for a suitable time whereupon it is removed from the solution and allowed to dry. By way of example, in an illustrative cell, the organic electron donor material can be polyvinylpyridine and the solvent can be tetrahydrofuran. The resulting impregnated thin film or substrate, which is a porous, non-woven polymeric film, is cut out or otherwise formed to have a peripheral outline or border matching that of the anode plate or element which it is to coat. Then the film is applied to the operative surface of the anode element by pressing with suitable force to pressure bond the film to the anode plate. One method of pressing a thin film coating to a lithium anode element is described in U.S. Pat. No. 4,359,818 issued Nov. 23, 1982, the disclosure of which is hereby incorporated by reference. In the cell of the present invention each lithium anode element 34,36 is coated in the same way, and the resulting anode 30 with coatings 70,72 adhered to the relatively flat-oppositely directed anode surfaces as shown in FIGS. 2 and 3.

Applying the impregnated film by pressure bonding requires only the mechanical energy of pressing, in contrast to some other methods such as hot pressing which have energy requirements as well as handling requirements. A further advantage is that the resulting coating is more uniform as compared to a coating which is painted or brushed on the anode surface. Furthermore, the present invention enables the weight of each coating, which affects battery performance and characteristics, to be controlled precisely. In addition, a significant advantage of the present invention is a coating which has a desirable degree of flexibility which is retained under dry room conditions. Such flexibility is of importance, for example, in facilitating handling and pressure bonding of the film to the anode element to provide proper conformance and adherence to the anode surface. While this is important even in situations where the anode surfaces are flat as in FIGS. 2 and 3, flexibility becomes particularly important when the preformed film is to be applied to the anode surface which is not flat but instead has surface formations for the purpose of increasing the available anode surface for operative contact with the cathode material. This now will be described.

Figure 5:
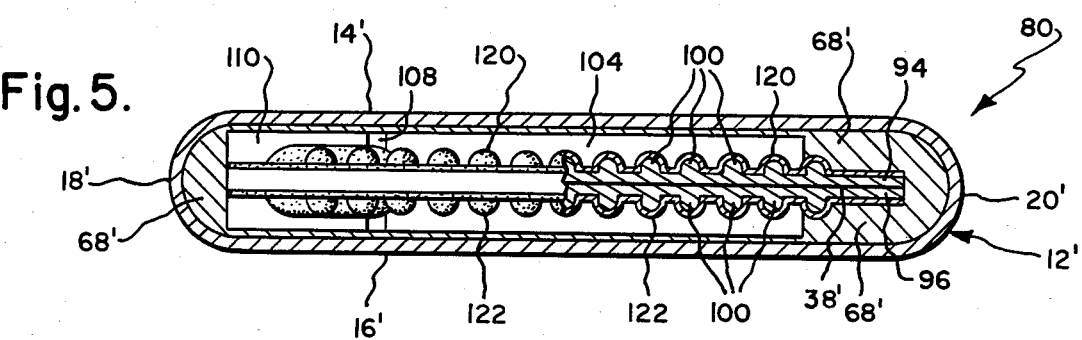
FIG. 5 is a sectional view taken about on line 5—5 in FIG. 4.
Figure 6:
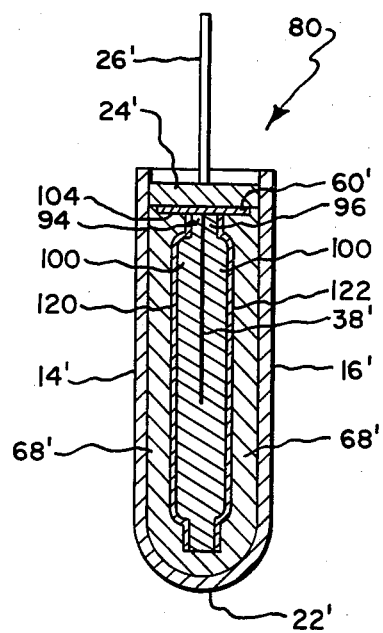
FIG. 6 is a sectional view taken about on line 6—6 in FIG. 4.

FIGS. 4–6 illustrate an alkali metal/halogen electrochemical cell 80 including a coated anode according to another embodiment of the present invention. In FIGS. 4–6 components of cell 80 which are identical to components of cell 10 in FIGS. 1–3 are identified by the same reference numeral with a prime designation. Thus, the coated anode and other cell components are contained within a casing 12' of metal such as stainless steel including spaced apart side walls 14',16' joined by curved end walls 18',20' and a curved bottom wall 22'. The open top of casing 12' is closed by a lid 24'. Terminal leads 26',28' extend from lid 24' which lid is of conductive metal and welded to casing 12'.

Electrochemical cell 80 includes an anode generally designated 90 according to this embodiment of the present invention and comprising an anode body 92 of alkali metal, preferably lithium. The body 92 can comprise a pair of lithium plates 94,96 pressed together and bonded against an anode conductor 38' which is a portion of the anode conductor means of the cell. Conductor 38' thus is sandwiched between plates 94,96 and can be of various forms such as a length of wire, a strand or ribbon or a mesh or screen and of metal such as nickel or nickel/alloy.

In the anode 90 of this embodiment of the present invention, at least one and preferably both of the oppositely directed lithium surfaces of plates 94,96 is shaped to include formations which increase the surface area thereof. The formations are designated 100 and each formation is elongated and having terminations at both ends thereof. The terminations are spaced inwardly a short distance from the peripheral edge of the anode assembly thereby defining a marginal border region between a peripheral edge and the terminations of the formations. The formations 100 are generally mutually parallel and also are generally parallel to the longitudinal axis of lead 26',28'. The formations 100, which are in the shape of ribs or corrugations, have generally smooth outer surfaces and preferably are generally semi-circular in cross-section. In the anode structure shown, the ribs 100 occupy a major portion of the outer surface of each lithium element. The remaining surface portions are generally planar and mutually generally parallel except around conductor 38' where they are curved or outwardly bulged slightly.

The edge or periphery of each anode plate is shown in FIG. 4 and is similar to that of anode plates 32,34 in FIGS. 2 and 3. In particular, each plate, for example, plate 94 shown in FIG. 4, has a curved edge 102 extending along a major portion of the periphery or border and having a curvature conforming generally to curvature of casing bottom wall 22'. A relatively straight edge portion 104 also is provided and meets curved edge 102 through step-like portions at each end thereof. In particular, the left-hand end of edge 104 meets a relatively short inclined edge portion 108 which, in turn, meets another relatively short edge portion 110 leading to one end of curved edge 102. Edge 110 is disposed generally parallel to edge 104 and is longer than edge 108. Similarly, the right-hand end of edge 104 meets a relatively short inclined edge portion 112 which, in turn, meets another relatively short edge portion 114 leading to the other end of curved edge 102. Edge 114 is disposed at an acute angle to edge 104 and is longer than edge 112. Plate 96 is identical to plate 94 in size and peripheral outline, the two plates being in registry or alignment when pressed together.

A strip or band of insulating material 60' is placed on and extends along edge 104 and the edge portions 108 and 110. Insulator 60' serves to insulate anode 90 from the metal lid 24' of casing 12' in a completed or assembled cell. An anode lead 26' extends from anode conductor 38' through an insulator and seal structure 66' and through lid 24' to serve as one terminal for providing electrical connection to the cell. Lead 28' provides the other cell terminal.

In accordance with the present invention, the surface of anode 90 in operative contact with the halogen-type containing cathode/electrolyte 68' is provided with a coating comprising a thin film of substrate material impregnated with organic electron donor material. In the cell of this embodiment, anode body 92 has two oppositely directed operative surfaces which are the exposed surfaces of plates 94,96 each having the formations 100 and the surfaces are provided with coatings 120 and 122, respectively, according to the present invention. Each coating, for example coating 120, comprises a thin film of substrate material preferably in the form of synthetic open-mesh fabric material. As in the embodiment of FIGS. 1–3, substrate can be of polyester open-mesh fabric material. The thin film or substrate is impregnated with organic electron donor material. As in the previous embodiment, the film or substrate is dipped into a solution of the organic material and solvent for a suitable time whereupon it is removed from the solution and dried. The organic electron donor material can be polyvinylpyridine and the solvent can be tetrahydrofuran as in the previous embodiment. The thin film or substrate is cut out or otherwise formed to have a peripheral outline matching that of the anode plate or element which it is to coat. Then the film is applied to the operative surface of the anode element by pressing with suitable force to pressure bond the film to the anode plate. In pressing the impregnated film on the anode surface, it is conformed to the surfaces of the formations 100 as well as to the remaining surface of the anode element. The pressing can be performed in the manner illustrated in U.S. Pat. No. 4,359,818 referenced hereinabove. Each lithium anode element 94,96 is coated in the same way, and the resulting anode 90 with coatings 120,122 adhered to the oppositely directed surfaces including formations is shown in FIGS. 4 and 5.

The anode coating according to this embodiment of the present invention has all the advantages provided by the coating shown and described in connection with FIGS. 1-3. In addition, the flexibility of the coating is of particular importance in bonding the thin film coating to the anode surfaces with formations 100. The flexibility enhances the shaping of the film to the curvature and shape of the formations and the neighboring flat surface and enhances the bond thereto.

The coated anode of the present invention can be employed in an alkali metal-oxyhalide electrochemical cell. In a liquid electrolyte cell of this type, an alkali metal anode such as a lithium anode is positioned in a cell casing between a pair of carbon cathodes. A separator is employed, surrounding the anode and isolating it from each cathode. The cell casing is filled with liquid electrolyte, for example thionyl chloride with lithium tetrachloroaluminate dissolved therein. For a more detailed description of a liquid electrolyte cell of this type, reference may be made to the above-identified U.S. Pat. Nos. 3,993,501, 4,400,453 and 4,666,799 the disclosure of each of which is hereby incorporated by reference.

In accordance with the present invention, the surface of the anode in contact with the liquid electrolyte is provided with a coating comprising a porous thin film substrate impregnated with organic material, such as polyvinyl chloride as disclosed, for example, in U.S. Pat. No. 3,993,501. In particular, in the liquid electrolyte cell of this illustration the anode has two oppositely directed operative surfaces facing the corresponding separators. Both surfaces are provided with coatings according to the present invention. Each coating comprises a thin film of substrate material preferably in the form of porous or synthetic open-mesh material. The thin film or substrate is impregnated with organic material. In particular, the substrate is dipped into a solution of the organic material and solvent for a suitable time whereupon it is removed from the solution and dried. The thin film or substrate is cut out or otherwise formed to have a peripheral outline matching that of the anode surface which it is to coat. Then the film is applied to the operative surface of the anode body for pressing with suitable force to pressure bond the film to the anode body. The pressing can be performed in the manner illustrated in U.S. Pat. No. 4,359,818 referenced hereinabove.

The anode coating according to this illustration has all the advantages provided by the coating shown and described in connection with FIGS. 1-6.

The following example further illustrates the coated anode of the present invention employed in an alkali metal-oxyhalide electrochemical cell:

EXAMPLE I

Thionyl chloride batteries were built in the configuration described hereinabove with uncoated and coated anodes. The batteries then were discharged to test the effect of anode coating application techniques on the moderate rate discharge performance of thionyl chloride batteries.

In particular, polyvinyl chloride was the organic material used in the anode coating. A solution of polyvinyl chloride in dimethylformamide/tetrahydrofuran was used for dip coating anodes. The average coating weight for a dip coated anode was 0.0232 g. Two additional groups of anodes were coated by precoating glass fiber sheets with polyvinyl chloride and then pressing the sheets onto the lithium at the time of anode pressing. Two types of glass sheets were used, Crave glass and Manning glass. Glass is a preferred substrated material because of its compatibility with the thionyl chloride electrolyte. The average coating weight applied with the glass sheets was 0.034 g. Battery assembly is faster with the sheet coating as the anodes do not have to be dried, and the cells can be taken from press to pour in one day.

Table I summarizes the capacities delivered by the coated and uncoated cells under 300 ohm discharge. The batteries which had dip coated anodes delivered an average 2.39 ampere hours while batteries with sheet coated anodes delivered from 2.15 to 2.22 ampere hours. The uncoated cells delivered 2.1 and 2.15 ampere hours. Both the dip coated and sheet coated anodes delivered higher capacity than those with no coating under 300 ohm discharge. The sheet coated anodes of course have the advantages of faster battery assembly, coating flexibility and uniformity, and coating weight control as described hereinabove.

TABLE I

| Coating | Capacity to 3.0 volts | |
|---|---|---|
| | mAh to 3.0 volts | Ah/g carbon |
| none | 2100 | 4.2 |
| none | 2150 | 4.3 |
| dip coated | 2400 | 4.8 |
| dip coated | 2380 | 4.76 |
| sheet coated (Crane glass) | 2160 | 4.32 |
| sheet coated (Crane glass) | 2150 | 4.3 |
| sheet coated (Manning glass) | 2180 | 4.36 |
| sheet coated (Manning glass) | 2220 | 4.44 |

Figure 7:
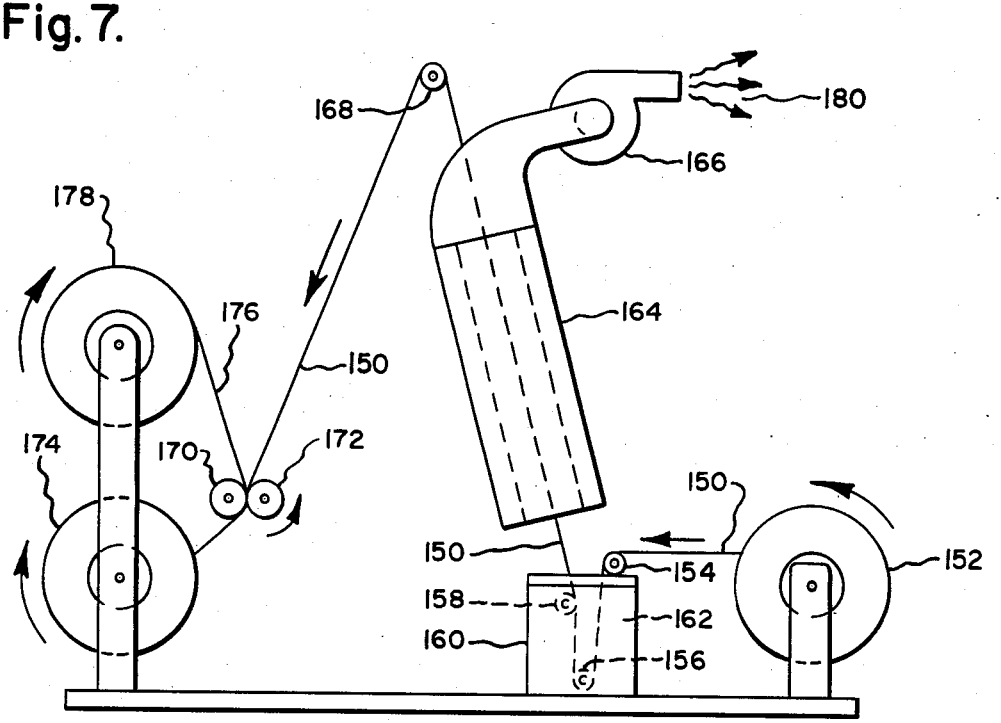
FIG. 7 is a diagrammatic view of apparatus used in performing the method of the present invention.

FIG. 7 illustrates diagrammatically the apparatus and method for impregnating the thin film of substrate material with organic material according to the present invention. The substrate material designated 150 in FIG. 7 is in tape form and is withdrawn from a supply reel 152 and guided by rollers 154,156 and 158 into and out of a vessel or tank 160 containing a solution of an organic electron donor material or other suitable organic coating material 162. The tape leaving container 160 is impregnated with the liquid and is drawn through a hot air dryer 164 associated with a fan 166 whereupon it is guided by an arrangement including a single roller 168 and a pair of rollers 170,172 and wound up on a take-up reel 174. A motor (not shown in FIG. 7) drivingly coupled to reel 174 controls the speed of the immersion process and subsequent drying. A parting sheet 176 wound on a reel 178 is applied to tape 150 by rollers 170,172 for the purpose of preventing tape 150 from sticking together when wound on take-up reel 174. Sheet 176 can be of polypropylene material, and the use of parting sheet 176 may not be necessary in all cases depending on the nature of the substrate material and the solvent. The depth of roller 156 below the level of liquid 162 controls the exposure time of tape 150 to the solution of organic material. Air currents from dryer 164 are designated 180 in FIG. 7. Upon leaving dryer 164 the tape 150 must be dry enough to avoid sticking to roller 168 but not excessively dry that the tape 150 is brittle and cracks upon travelling through rollers 170,172. Operating dryer 164 at a temperature in the range 50° C.-150° C., preferably about 85° C., has been found to be satisfactory. The impregnated substrate material 150 subsequently can be withdrawn from reel 174 and cut to desired shapes for pressing onto lithium anodes.

Figure 8:
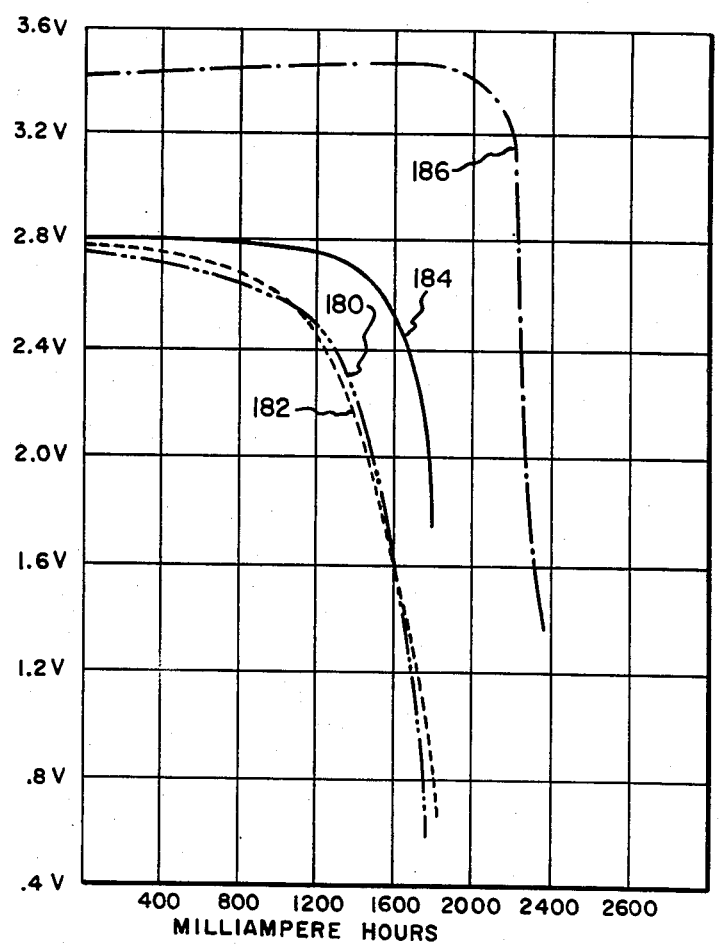
FIG. 8 is a graph including discharge curves further illustrating the anode coating according to the present invention.

FIG. 8 is a graph including discharge curves illustrating the coated anode according to the present invention. The discharge curves illustrate cell open circuit voltage over time. Discharge curve 182 is for a cell with a prior art painted anode coating and with a 20Kohm load on the cell, and curve 180 is for a cell including a coated anode according to the present invention and with a 20Kohm load. Discharge curve 184 is for a cell including an anode coating according to the present invention wherein the data has been converted or interpolated to a 140Kohm load from the 20Kohm load data. Curve 186 is a 300 ohm discharge curve of a liquid electrolyte cell with a coated anode according to the present invention, in particular the last cell listed in Table 1 of Example I.

Figure 10:
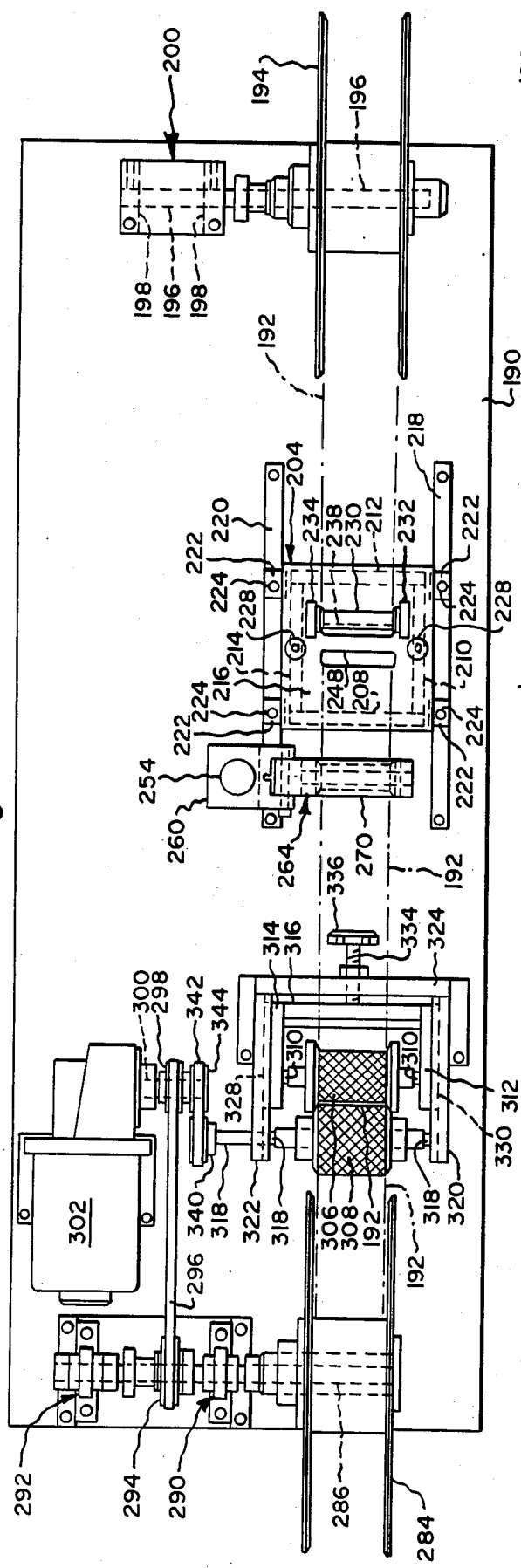
FIG. 10 is a top plan view thereof.
Figure 9:
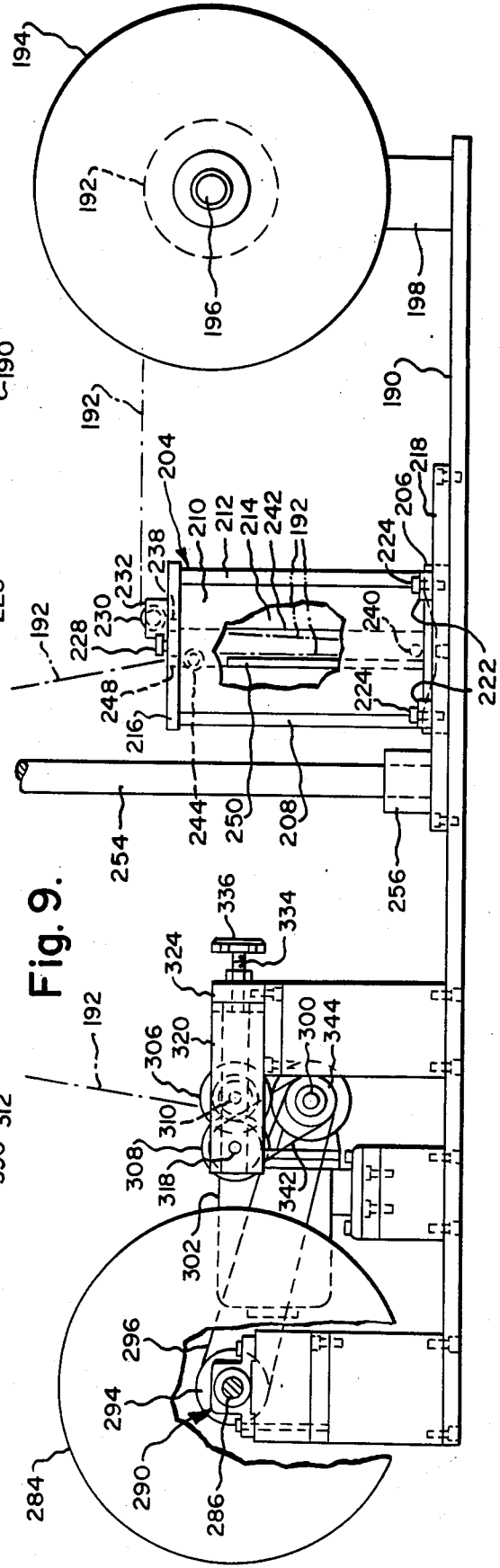
FIG. 9 is a fragmentary side elevational view of apparatus for performing the method of the present invention.
Figure 11:
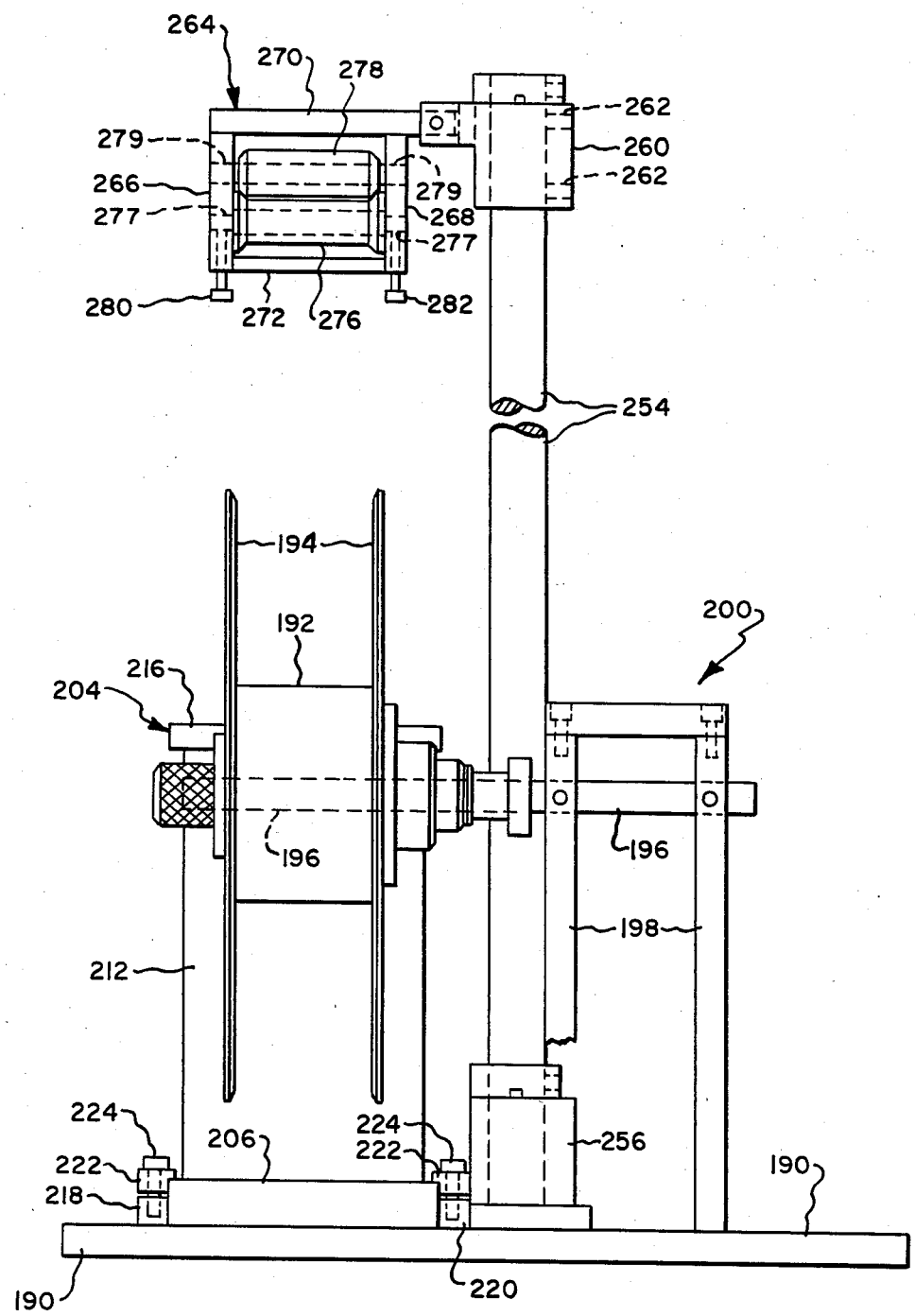
FIG. 11 is an end elevational view thereof.

FIGS. 9–11 illustrate in further detail the method and apparatus for impregnating the thin film of substrate material with organic material according to the present invention. The apparatus includes an elongated supporting base or platform 190. The substrate material 192, in tape form, is stored on a supply reel 194 located at one end of the base 190. In particular, reel 194 is mounted on one end of a shaft 196 disposed parallel to the plane of base 190 and elevated therefrom. The other end of shaft 196 is rotatably mounted in spaced-apart legs 198 of a mounting bracket housing 200 secured to base 190. The apparatus further comprises a vessel or container generally designated 204 for holding a solution of organic material and serving as a bath into which the strip or tape of substrate material is dipped or immersed for coating the same. In particular, container 204 is hollow rectangular in shape having a base or bottom 206, four upstanding side walls 208, 210, 212 and 214 and a top or cover 216. Container 204 is mounted on a pair of spaced apart, parallel tracks or guides 218 and 220 by means of brackets 222 secured to tracks 218 and 220 by fasteners 224. The location of container 204 can be adjusted longitudinally along tracks 218 and 220 simply by loosening the fasteners 224, sliding the container 204 therealong and re-tightening the fasteners. Cover 216 is removably secured to container 204 by fasteners 228. The inner surface of base 206 is curved as shown in FIG. 9 to accommodate circulation of the solution as tape 192 travels therein.

The strip or tape 192 of substrate material is guided through the liquid bath in container 204 in the following manner. A first guide roller 230 is rotatably mounted to a pair of spaced-apart brackets 232, 234 fixed to container top 216. Roller 230 is cylindrical and has a width substantially equal to the width of tape 192. A first elongated slot 238 is provided in cover 204 and located adjacent roller 230 and disposed with the longitudinal axis of slot 238 substantially parallel to the rotational axis of roller 230. The length of slot 238 is equal to or slightly greater than the width of tape 192. A second elongated guide roller 240 is rotatably mounted in container 204 near base 206, being disposed parallel to and in registry with slot 238 and roller 230 and having a length equal to or slightly greater than the width of tape 192. Roller 240 is rotatably mounted at the opposite ends in frame members which depend from cover 216 and extend along and inside the opposite side walls 210 and 214 of container 204, one frame being designated 242. As shown in FIG. 9, roller 240 is located about mid-way between the other two side walls 208, 212 of container 204. A third elongated guide roller 244 is rotatably mounted in container 204 near top 216, being disposed parallel to and in registry with slot 238 and the second roller 240 and having a width equal to or slightly greater than the width of tape 192. Roller 244 is rotatably mounted at opposite ends in the same depending frames along side walls 210, 214 of container 204 as roller 240, i.e. in frame 242. As shown in FIG. 9, roller 244 is located substantially mid-way between the other two side walls 208, 212 and with the longitudinal axis thereof slightly offset from the axis of roller 240 in a direction away from slot 238. Top 216 is provided with a second elongated slot 248 adjacent the location of roller 244 and of the same shape and size as slot 238 and located in registry therewith. A vertical supporting member or plate 250 is provided, being secured to the interior frames, i.e. member 242, and located slightly offset from the axis of roller 240 toward a plane intersecting the axis of roller 244. Plate 250 serves to guide the travel of tape 192 through the liquid bath as will be described.

Thus, as illustrated in FIG. 9 tape 192 is withdrawn from reel 194 and extends around the first guide roller 230 and through the first slot 238 into the interior of container 204 for immersion in the liquid bath contained therein. Tape 192 travels downwardly in container 204 for substantially the full height or length therein whereupon it is trained around the second guide roller 240 and travels along or adjacent to plate 250 in a return direction toward top 216, being guided by plate 250. Near top 216 tape 192 is guided by the third roller 244 and extends through the second slot 248 thereby exiting the container 204. Tape 192 leaves container 204 impregnated with the solution of organic material, and tape 192 is guided along a path in a manner allowing drying of the tape 192 prior to being stored. During travel of tape 192 along this path it is dried by suitable drying apparatus (not shown in FIGS. 9–11) such as the dryer 164 shown in FIG. 7. Various drying methods and apparatus can of course be employed. Tape 192 is guided along this path for drying prior to storage by the following arrangement.

A vertically disposed supporting arm or rod 254 is connected to base 190 in a suitable manner, such as by a collar 256 threaded or otherwise connected to the lower end of rod 254 and mounted on the surface of base 190. The location of rod 254 on base 190 is near container 204 and so as to be spaced therefrom in a direction toward the end of base 190 opposite the end containing supply reel 194. A pair of guide rollers between which tape 192 is passed is supported at the upper end of rod 254. In particular, as shown in FIG. 11, a collar 260 is fastened to the upper end of rod 254 by screws 262 or the like. A frame generally designated 264 is mounted on collar 260 and extends from rod 254. Frame 264 includes a pair of depending side members 266, 268 in spaced, generally parallel relation joined to an upper member which, in turn, is connected to collar 260 in a suitable manner. A lower supporting member 272 also joins the arms 266, 268. A first, elongated cylindrical roller 276 is rotatably mounted at opposite ends in frame members 266, 268 by roller shaft 277 received in appropriate openings. A second, elongated cylindrical roller 278 also is rotatably mounted at opposite ends in frame members 266, 268 by a roller shaft 279 being received in appropriate openings. The rollers 276, 278 are disposed with the axes mutually parallel and the surfaces in substantial contact. A pair of adjustment screws 280, 282 threaded in frame members 266, 268 act on the shaft 277 of roller 276 to urge roller 276 toward and away from roller 278. The axes of rollers 276, 278 are substantially parallel to the axes of rollers 230, 240 and 244 and are in registry therewith. Thus, the impregnated tape 192 leaves container 204, travels along an upstanding inclined path through the drying region or apparatus provided and extends through rollers 276,278 whereupon it begins travel along a path toward a storage arrangement which now will be described.

A take-up or storage reel 284 is provided for receiving the dried, impregnated tape 192 which is wound therearound for storage prior to cutting thereof into appropriate anode configuration. Reel 284 is located in registry with the path of tape 192 and is mounted on one end of a shaft 286, which, in turn, is rotatably mounted at spaced locations in a pair of pillow blocks 290,292. A sprocket 294 is fixed to shaft 286 between pillow blocks 290,292 and a drive belt or chain 296 is trained around sprocket 294 in driving engagement therewith. Chain 296 is driven by another sprocket 298 fixed to the output shaft 300 of a drive motor 302 mounted on base 190. Thus, operation of motor 302 drives chain 296 to rotate take-up reel 284 to wind the dried, impregnated tape 192 onto reel 284 for storage.

Prior to entering take-up reel 284, tape 192 is guided between a pair of rollers 306,308, one of which is driven by motor 302 in synchronism with the rotation of reel 284. In particular, roller 306 has a drive shaft 310 which is rotatably connected at opposite ends to corresponding arms 312,314 of a frame which includes a web 316, joining the arms 312,314. Similarly, roller 308 has a shaft 318 which is rotatably connected at opposite ends to corresponding arms 320,322 of a frame which has a web 324 joining the arms 320,324. Arms 320 and 322 are provided with recess 328 and 330, respectively, defining tracks for receiving arms 312 and 314 respectively of the other frame in sliding relation. Thus, the frame holding roller 306 is movable along within the frame holding roller 308 so that the distance between the surfaces of rollers 306,308 can be adjusted. Movement between the frames can be provided by an adjustment screw 334 fixed at one end to web 316, threaded in web 324 and having a knob 336 at the other end thereof. Roller 308 is driven by motor 302 by the following arrangement. The roller shaft 318 extends out beyond the frame end and has a sprocket 340 fixed to the end thereof. A drive belt or chain 342 is trained around sprocket 240 in driving engagement therewith. Chain 342 is driven by another sprocket 344 fixed to the output shaft 300 of motor 302.

In the method and apparatus illustrated in FIGS. 9–11, it is important that moving air be employed for drying of tape 192. The only factor affecting the speed at which tape 192 travels through the apparatus is that the tape be dry by the time it reaches the upper rollers 276,278. The thickness of the organic material which impregnates tape 192 is controlled by roller 244 and the angle over which tape 192 is drawn on roller 244. For example, at one extreme if tape 192 is drawn along roller 244 in a straight up or vertical direction as viewed in FIG. 9 roller 244 has no effect on the thickness. The inner plate 250 insures a proper approach of tape 192 to roller 244. Rollers 306 and 308 serve to smooth out any particulate matter remaining on the surface of the tape. The force or pressure to accomplish this is adjustable by means of knob 366 and screw 334. The arrangement of rollers 230, 240 and 244 is held in the bracket 232 and frames 242 attached to lie 216 so as to be removable from the vessel or container 204 as an assembly and placed in a beaker or similar container which vessel 204 is being refilled.

By way of example, in an illustrative method and apparatus the amount of impregnated tape 192 in one lot is determined by the volume of coating solution or liquid and one lot according to this example is 500 ml. Furthermore, according to this example one lot of material coats 100 feet of substrate material in approximately 1½ hours production time. The concentration of organic electron donor material in the solvent, in particular the weight of polyvinylpyridine in the tetrahydrofuran in the solution is in the range from about 5% to about 35%. In an illustrative solution, a quantity of 15 grams polyvinylpyridine is dissolved in 100 ml tetrahydrofuran. In this example the substrate thickness was 1 mil and the coated substrate or end product had a thickness of 4.5 mils.

The present invention is illustrated further by the following examples.

EXAMPLE II

Thin strips of polypropylene, nylon and viscose material were dipped at room temperature in a 15% by weight solution of polyvinyl pyridine in tetrahydrofuran. The strips were removed and allowed to stand in a dry room over a weekend. The polypropylene used was Webril non woven fabric grade E 1452 having an approximate thickness of 0.005 inch and the nylon used had a thickness of 0.007 inch. After that period of time the strips were observed to be still very flexible.

The polypropylene strip took on approximately 0.030 gram of polyvinylpyridine in one square inch, the viscous strip took on approximately 0.050 gram of polyvinylpyridine in one square inch and the nylon took on approximately 0.040 gram of polyvinyl pyridine in one square inch. The polypropylene strip was re-dipped in the polyvinylpyridine-tetrahydrofuran solution, dried, cut out to an anode shape or configuration and allowed to stand in a dry room overnight.

The next day two anode assemblies were made using the impregnated polypropylene strips. They were of the type generally shown in FIGS. 1–3. Since the impregnated strip cut or punched out to anode configuration weighed 0.120 gram and an unimpregnated polypropylene strip cut or punched out to the identical configuration weighed 0.020 gram, the weight of the coating on each side of the anode is 0.100 gram. The total coating weight per battery thus is 0.200 gram which is considered to be about double the minimum desired coating weight in a lithium battery of the type under consideration. The weight of depolarizer poured into the battery was slightly under the minimum weight required by specifications, but adequate for battery operation. During a one day test, the following results were obtained.

|  | Impedance | Open Circuit Voltage |
| --- | --- | --- |
| Battery #1 | 108 ohms | 2.787 volts |
| Battery #2 | 137 ohms | 2.783 volts |

EXAMPLE III

A group of 12 prismatic, half-round batteries of nominal dimensions 7 mm by 23 mm by 45 mm and incorporating the design features illustrated in FIGS. 4–6 were constructed using the anode-coating techniques of the present invention. The coating material was polyvinylpyridine dissolved in tetrahydrofuran, and the substrate material was #3251 Hollytex-Paper polyester. The cells were placed on test at 37° C. under a constant resistive load of 20kohms. Electrical performance was compared with that of otherwise identical cells made with the former method of brush-coating the anodes with polyvinylpyridine dissolved in tetrahydrofuran. Cells made with the new coating method showed electrical performance virtually indistinguishable from the brush-coated cells. FIG. 8, curves 180 and 182 show representative performance of the two groups of cells. Both groups of cells achieved a capacity of 1.6 Ah to a cutoff voltage of 1.6 volts. Although there are minor differences in the shapes of the curves, there are no significant differences in cell performance or capacity.

It is therefore apparent that the present invention accomplishes its intended objects. While embodiments of the present invention have been described in detail, that is for the purpose of illustration, not limitation.

I claim:

1. In an alkali metal-halogen electrochemical cell wherein an alkali metal anode has a surface in operative contact with a solid electrolyte, the improvement comprising:
   a coating on said anode surface comprising a thin film of substrate material impregnated with organic electron donor material.

2. An electrochemical cell according to claim 1, wherein said anode is of lithium.

3. An electrochemical cell according to claim 1, wherein said substrate is of flexible material.

4. An electrochemical cell according to claim 1, wherein said substrate is of synthetic open-mesh fabric material.

5. An electrochemical cell according to claim 1, wherein said substrate is of polyester open-mesh fabric.

6. An electrochemical cell according to claim 1, wherein said film is adhered to said anode by pressing.

7. An electrochemical cell according to claim 1, wherein said anode surface is relatively flat and said coating is adhered to said surface.

8. An electrochemical cell according to claim 1, wherein said anode surface is provided with formations to increase the surface area thereof and said coating is adhered to said surface.

9. An electrochemical cell according to claim 1, further including a cathode comprising a charge transfer complex formed from iodine and polyvinylpyridine.

10. An electrochemical cell according to claim 1, wherein said coating is in the form of a unitary body.

11. In a lithium-halogen electrochemical cell wherein a lithium anode has a surface in operative contact with a solid electrolyte, the improvement comprising:
    a coating adhered to said lithium anode surface comprising a thin film of synthetic open-mesh fabric material impregnated with organic electron donor material.

12. An electrochemical cell according to claim 11, wherein said substrate is of polyester open mesh fabric.

13. An electrochemical cell according to claim 11, wherein said film is pressure-bonded to said lithium anode surface.

14. An electrochemical cell according to claim 11, wherein said lithium anode surface is relatively flat.

15. An electrochemical cell according to claim 11, wherein said lithium anode surface is provided with formations to increase the surface area thereof.

16. An electrochemical cell according to claim 11, further including a cathode comprising a charge transfer complex formed from iodine and polyvinylpyridine.

17. An electrochemical cell according to claim 11, wherein said coating is in the form of a unitary body.

18. An anode for an alkali metal-halogen electrochemical cell comprising:
    (a) an anode body of alkali metal having a surface for operative contact with a solid electrolyte of the cell;
    (b) anode electrical conductor means operatively associated with said anode body; and
    (c) a coating on said anode surface comprising a thin film of substrate material impregnated with organic electron donor material.

19. An anode according to claim 18, wherein said body is of lithium.

20. An anode according to claim 18, wherein said substrate material is flexible.

21. An anode according to claim 18, wherein said substrate is of synthetic open mesh fabric material.

22. An anode according to claim 18, wherein said film is adhered to said anode by pressing.

23. An anode according to claim 18, wherein said anode surface is relatively flat and said coating is adhered to said surface.

24. An anode according to claim 18, wherein said anode surface is provided with formations to increase the surface area thereof and said coating is adhered to said surface.

25. An anode according to claim 18, wherein said coating is in the form of a unitary body.

26. In an alkali metal-oxyhalide electrochemical cell wherein an alkali metal anode has a surface in operative contact with a liquid cathode/electrolyte, the improvement comprising:
    a coating on said anode surface comprising a thin film of substrate material impregnated with organic material.

27. An electrochemical cell according to claim 26, wherein said anode is of lithium.

28. An electrochemical cell according to claim 26, wherein said substrate is of flexible material.

29. An electrochemical cell according to claim 26, wherein said substrate is of synthetic material.

30. An electrochemical cell according to claim 26, wherein said film is adhered to said anode by pressing.

31. An electrochemical cell according to claim 26, wherein said coating is in the form of a unitary body.

32. In an alkali metal-oxyhalide electrochemical cell wherein a lithium anode has a surface in operative contact with a liquid cathode/electrolyte, the improvement comprising:
    a coating adhered to said lithium anode surface comprising a thin film of synthetic porous material impregnated with organic material.

33. An electrochemical cell according to claim 32, wherein said substrate is of glass fiber material.

34. An electrochemical cell according to claim 32, wherein said film is pressure-bonded to said lithium anode surface.

35. An electrochemical cell according to claim 32, wherein said coating is in the form of a unitary body.

36. An anode for alkali metal-oxyhalide electrochemical cell comprising:
    (a) an anode body of alkali metal having a surface for operative contact with a liquid electrolyte of the cell;
    (b) anode electrical conductor means operatively associated with said anode body; and
    (c) a coating on said anode surface comprising a thin film of substrate material impregnated with organic material.

37. An anode according to claim 36, wherein said body is of lithium.

38. An anode according to claim 36 wherein said substrate material is flexible.

39. An anode according to claim 36, wherein said substrate is of synthetic porous material.

40. An anode according to claim 36, wherein said film is adhered to said anode by pressing.

41. An anode according to claim 36, wherein said coating is in the form of a unitary body.

42. A method of coating the operative surface of an anode for an electrochemical cell containing an alkali metal anode comprising the steps of:
(a) providing a thin film of substrate material;
(b) impregnating said film with organic material; and
(c) applying the impregnated film to said anode operative surface.

43. A method according to claim 42, wherein said anode is of lithium.

44. A method according to claim 42, wherein said substrate material is flexible.

45. A method according to claim 42, wherein said substrate material is synthetic open mesh fabric.

46. A method according to claim 42, wherein said step of impregnating said film with organic material comprises dipping said film into a solution of said organic material and solvent, removing said film from said solution, and drying said film.

47. A method according to claim 42, wherein said step of applying said impregnated film to said anode operative surface is done by pressing.

* * * * *